US012756648B2

(12) United States Patent
Terbush et al.

(10) Patent No.: US 12,756,648 B2
(45) Date of Patent: Oct. 6, 2026

(54) APPLICATION TRANSACTION MONITORING WITH CONTEXTUAL FLOW INFORMATION

(71) Applicant: Cisco Technology, Inc., San Jose, CA (US)

(72) Inventors: Ryan Nicholas Terbush, Laguna Hills, CA (US); Jason Lo, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/442,263

(22) Filed: Feb. 15, 2024

(65) Prior Publication Data

US 2025/0168094 A1 May 22, 2025

Related U.S. Application Data

(60) Provisional application No. 63/601,068, filed on Nov. 20, 2023.

(51) Int. Cl.
*H04L 43/10* (2022.01)

(52) U.S. Cl.
CPC .................................... *H04L 43/10* (2013.01)

(58) Field of Classification Search
CPC ....................................................... H04L 43/10
See application file for complete search history.

(56) References Cited

U.S. PATENT DOCUMENTS

| | | | | |
|---|---|---|---|---|
| 11,526,425 | B1 * | 12/2022 | Karis | G06F 11/3644 |
| 11,789,804 | B1 * | 10/2023 | Danyi | G06F 11/323 714/38.1 |
| 11,860,760 | B1 * | 1/2024 | Agarwal | G06F 16/00 |
| 2012/0260135 | A1 | 10/2012 | Beck et al. | |
| 2017/0269977 | A1 | 9/2017 | Brichford | |
| 2021/0026646 | A1 * | 1/2021 | Jha | G06F 9/3891 |
| 2022/0171689 | A1 * | 6/2022 | Barnsteiner | H04L 41/5009 |
| 2022/0245552 | A1 | 8/2022 | Ertl | |
| 2022/0398603 | A1 | 12/2022 | Manivannan et al. | |
| 2023/0033681 | A1 | 2/2023 | Hulick et al. | |
| 2025/0168091 | A1 * | 5/2025 | Terbush | H04L 43/062 |

* cited by examiner

*Primary Examiner* — Kamal M Hossain
(74) *Attorney, Agent, or Firm* — Lee & Hayes, P.C.

(57) ABSTRACT

In one embodiment, a method includes evaluating, by a device while traversing a plurality of ordered telemetry spans of a given trace message, whether any of the plurality of ordered telemetry spans are starting point spans of an application transaction and reporting, by the device, metrics corresponding to a particular application transaction based on a corresponding starting point span. The method further includes reporting, by the device, additional metrics from subsequent spans of the plurality of ordered telemetry spans following the corresponding starting point span within a context of the particular application transaction.

20 Claims, 6 Drawing Sheets

APPLICATION TRANSACTION MONITORING WITH CONTEXTUAL FLOW INFORMATION

RELATED APPLICATION

The present disclosure claims priority to U.S. Prov. Appl. Ser. No. 63/601,068, filed Nov. 20, 2023, for APPLICATION BUSINESS TRANSACTION MONITORING WITH CONTEXTUAL FLOW INFORMATION, by Ryan Nicholas TerBush, et al., the contents of which are incorporated herein by reference.

TECHNICAL FIELD

The present disclosure relates generally to computer systems, and, more particularly, to application transaction monitoring with contextual flow information.

BACKGROUND

The Internet and the World Wide Web have enabled the proliferation of web services available for virtually all types of businesses. Due to the accompanying complexity of the infrastructure supporting the web services, it is becoming increasingly difficult to maintain the highest level of service performance and user experience to keep up with the increase in web services. For example, it can be challenging to piece together monitoring and logging data across disparate systems, tools, and layers in a network architecture. Moreover, even when data can be obtained, it is difficult to directly connect the chain of events and cause and effect.

In particular, a business transaction for an application (or "application transaction") refers to the end-to-end, cross-tier processing path used to fulfill a request for a service provided by the application. For instance, in a retail application, a business transaction may correspond to user actions such as a user searching for a particular item, adding that item to their cart, beginning the checkout process, and completing payment of their purchase. Each of these actions may have associated actions within the application, such as making application programming interface (API) calls to an inventory service, a payment processing service, etc.

While business transactions afford observability platforms the ability to provide some visibility into the performance of the application from the vantage point of its users, doing so is also done today in the aggregate. For instance, continuing the case of a retail application, it is relatively trivial to answer the questions such as "how many calls were made to the checkout function, how many were successful, or how long did those calls take?"

However, current business transactions also lack any context, providing only limited benefit to administrators. For instance, simply tracking the above business transaction won't be able to answer the question "of the calls to inventory, how many were from people checking out and how many were from people removing items from their cart?" Such information could be quite valuable from a troubleshooting perspective.

BRIEF DESCRIPTION OF THE DRA WINGS

The embodiments herein may be better understood by referring to the following description in conjunction with the accompanying drawings in which like reference numerals indicate identically or functionally similar elements, of which:

Figure 5:
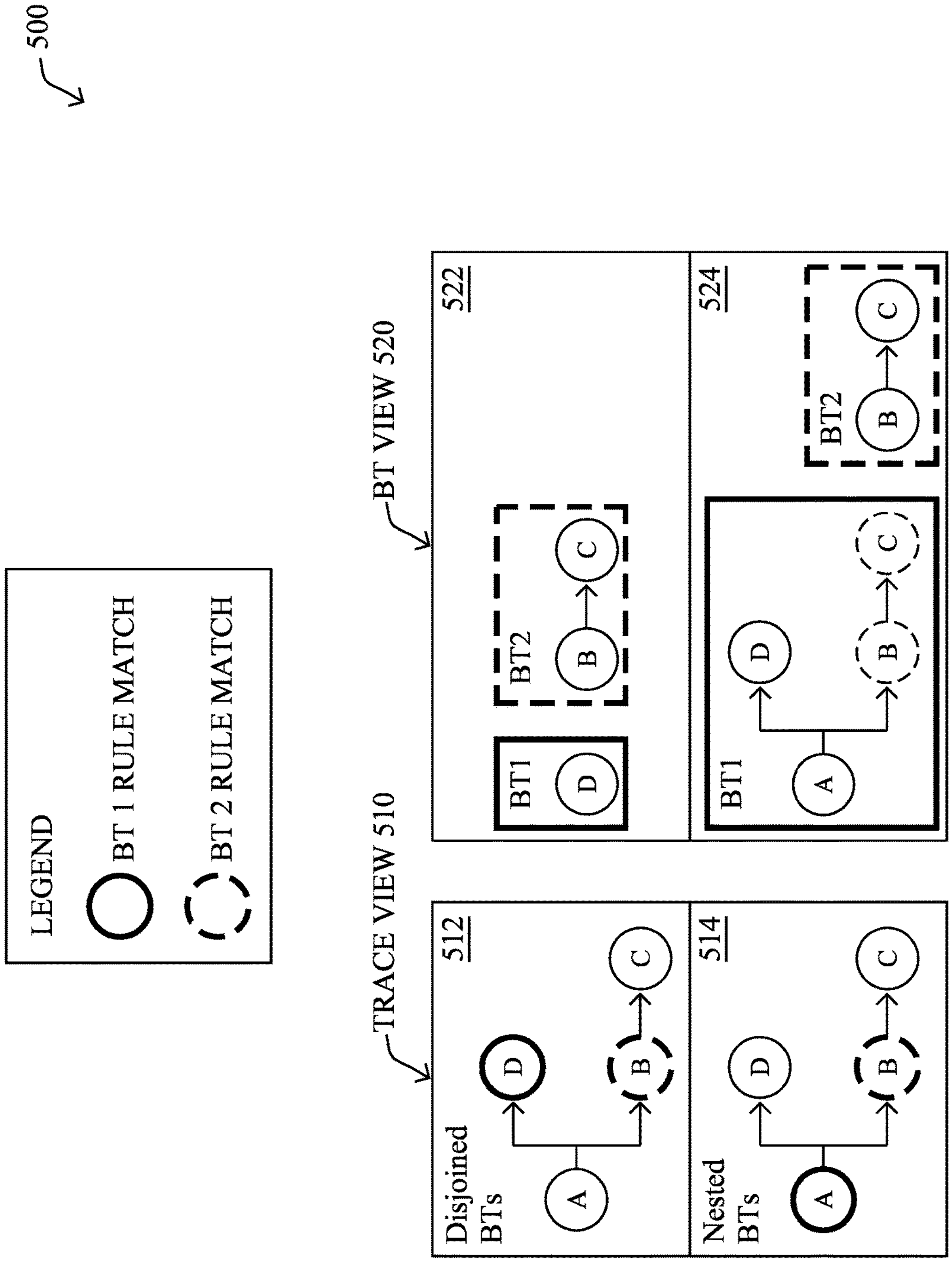
Figure 6:
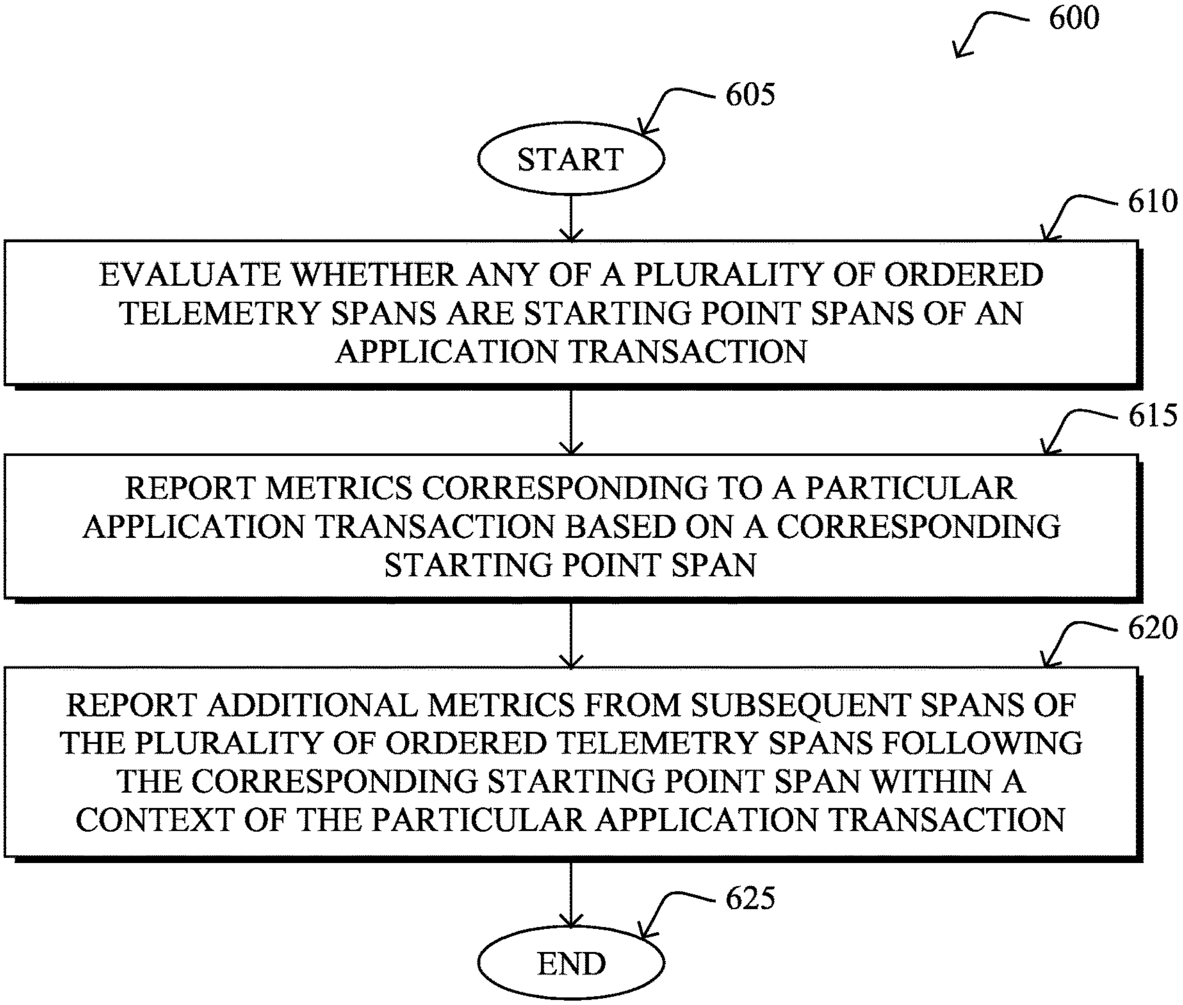

FIG. 5 illustrates an example of differences between trace views and business transaction views based on application transaction monitoring with contextual flow information according to the techniques herein; and FIG. 6 illustrates an example simplified procedure for a hybrid agent strategy for application transaction monitoring with contextual flow information in accordance with one or more implementations described herein.

DESCRIPTION OF EXAMPLE EMBODIMENTS

Overview

According to one or more implementations of the disclosure, a method includes evaluating, by a device while traversing a plurality of ordered telemetry spans of a given trace message, whether any of the plurality of ordered telemetry spans are starting point spans of an application transaction and reporting, by the device, metrics corresponding to a particular application transaction based on a corresponding starting point span. The method further includes reporting, by the device, additional metrics from subsequent spans of the plurality of ordered telemetry spans following the corresponding starting point span within a context of the particular application transaction.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
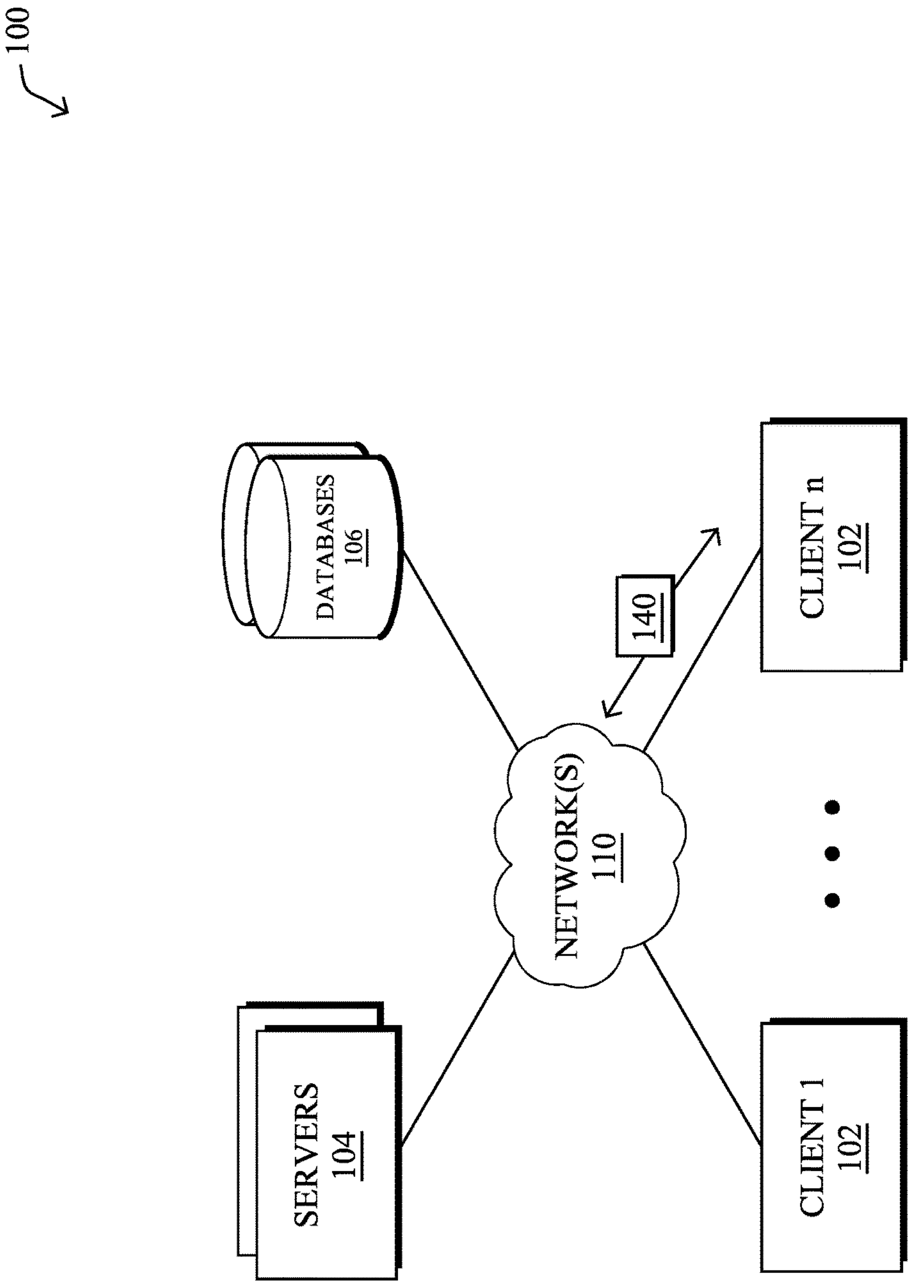
FIG. 1 illustrates an example computer network.

FIG. 1 is a simplified example schematic block diagram of a computing system 100 illustratively comprising any number of client devices (devices 102) (e.g., a first through nth client device), one or more servers (servers 104), and one or more databases (databases 106), where the devices may be in communication with one another via any number of networks (network(s) 110). The network(s) 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices (devices 102) may include any number of user devices or end point devices configured to interface with the techniques herein. For example, devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the computing system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
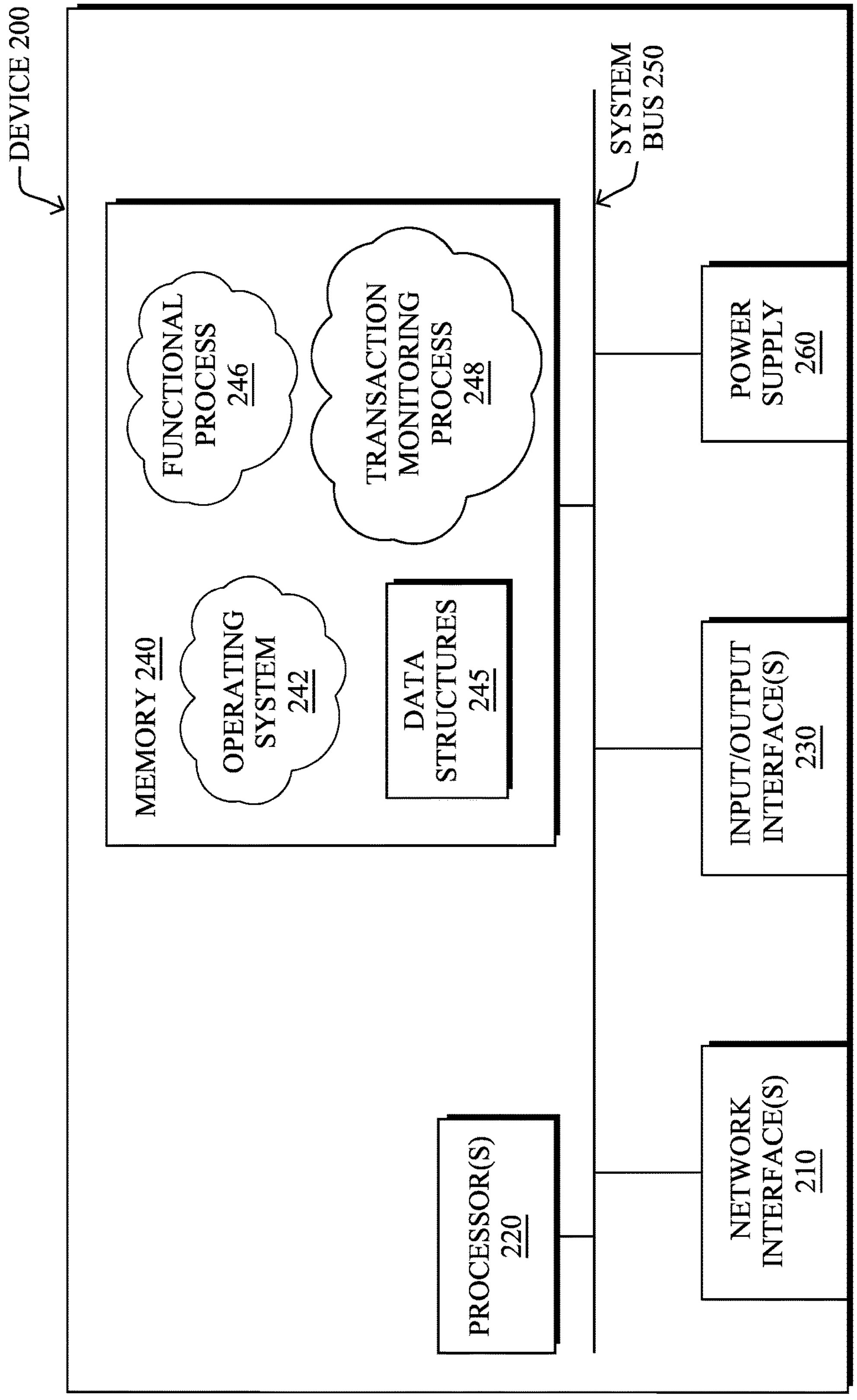
FIG. 2 illustrates an example computing device/node.

FIG. 2 is a schematic block diagram of an example node/device 200 that may be used with one or more implementations described herein, e.g., as any of the devices 102-106 shown in FIG. 1 above. Device 200 may comprise one or more of network interfaces 210 (e.g., wired, wireless, etc.), at least one processor (processor 220), and a memory 240 interconnected by a system bus 250, as well as a power supply 260 (e.g., battery, plug-in, etc.).

The network interfaces 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via network interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the implementations described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, a transaction monitoring process 248, as described herein. Notably, one or more functional processes 246, when executed by processor 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

——Observability Intelligence Platform——

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more implementations herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable implementation of categorical classification.

Figure 3:
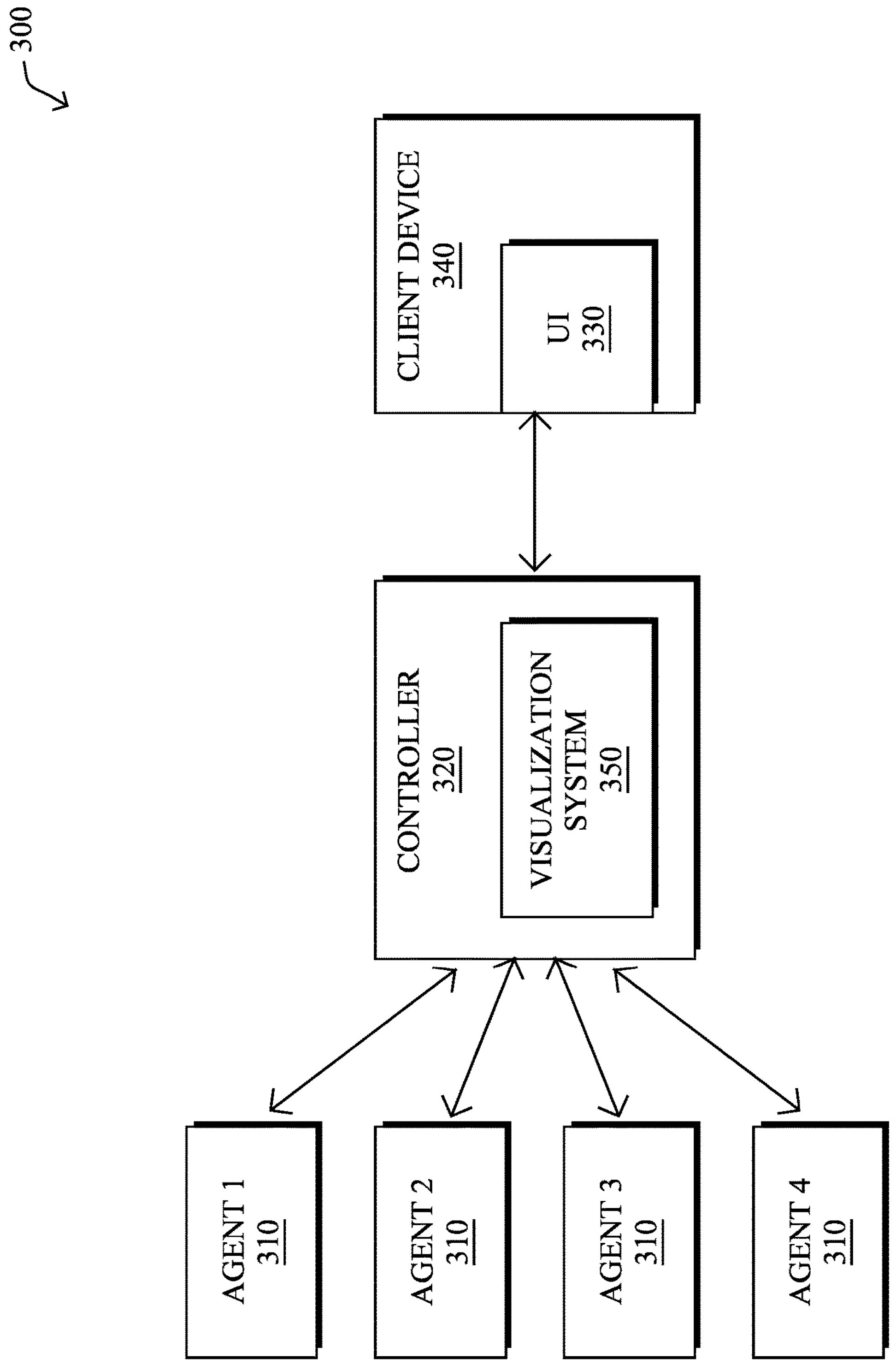
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents (agents 310) and one or more servers/controllers (e.g., controller 320). Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) (interface 330) that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, an instance of controller 320 may be hosted remotely by a provider of the observability intelligence platform 300. In an illustrative on-premises (On-Prem) implementation, a controller instance may be installed locally and self-administered.

The controllers 320 receive data from different agents (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain implementations, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one implementation, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain implementations, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the extensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

——Application Transaction Monitoring with Contextual Flow Information——

As noted above, business transactions are used to offer visibility into the performance of an application in the aggregate. Current business transactions lack any context, providing only limited benefit to administrators. As also mentioned above, however, such information could be quite valuable from a troubleshooting perspective. For example, if users are able to add items to their cart, but checkout fails, this might indicate that the payment processor is the root cause of the failure rather than the inventory call.

The techniques herein, therefore, provide for application transaction monitoring with contextual flow information. In particular, the techniques herein allow for contextual information to enhance application transactions (e.g., business transactions), giving greater visibility into the functions underlying a transaction and aiding in troubleshooting.

Notably, the techniques herein may employ any number of machine learning techniques, such as to evaluate ingested data as described herein. In general, machine learning is concerned with the design and the development of techniques that receive empirical data as input (e.g., collected metric/event data from agents, sensors, etc.) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, the techniques herein can use the model M to classify new data points. Often, M is a statistical model, and the cost function is inversely proportional to the likelihood of M, given the input data.

One class of machine learning techniques that is of particular use herein is clustering. Generally speaking, clustering is a family of techniques that seek to group data according to some typically predefined or otherwise determined notion of similarity.

Also, the performance of a machine learning model can be evaluated in a number of ways based on the number of true positives, false positives, true negatives, and/or false negatives of the model.

In various implementations, such techniques may employ one or more supervised, unsupervised, or semi-supervised machine learning models. Generally, supervised learning entails the use of a training set of data, as noted above, that is used to train the model to apply labels to the input data. On the other end of the spectrum are unsupervised techniques that do not require a training set of labels. Notably, while a supervised learning model may look for previously seen patterns that have been labeled as such, an unsupervised model may attempt to analyze the data without applying a label to it. Semi-supervised learning models take a middle ground approach that uses a greatly reduced set of labeled training data.

Example machine learning techniques that the techniques herein can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like.

For reference, the following discussion is a brief primer on OpenTelemetry:

- An "OpenTelemetry Trace" is defined as one or more OpenTelemetry Spans with all Spans sharing a common trace ID.
- An "OpenTelemetry Span" is reported from a monitored application by an OpenTelemetry SDK or auto-instrumentation agent and includes:
  - A pointer to the "parent" span, the span that captures what happened immediately before this one;
  - A set of attributes: Key/Value pairs with information about the running program;
  - A status: to indicate whether the application hit an error while processing this part of the request;
  - A span kind: helps describe what action this span captures (call entering/leaving a service, internal to the service, etc.);
  - A set of resource attributes: Key/Value pairs with information about where the span came from;
  - A name to summarize the operation the span represents; and
  - A start and end time.

Specifically, a method according to one or more embodiments herein may include evaluating, by a device while traversing a plurality of ordered telemetry spans of a given trace message, whether any of the plurality of ordered telemetry spans are starting point spans of an application transaction and reporting, by the device, metrics corresponding to a particular application transaction based on a corresponding starting point span. The method further includes reporting, by the device, additional metrics from subsequent spans of the plurality of ordered telemetry spans following the corresponding starting point span within a context of the particular application transaction.

Operationally, the techniques herein entail defining an application transaction entity to represent groups of requests that share some common trace structure and attribute patterns. The proposed system then uses these entities to produce contextualized metrics for data flow through the monitored system. Not only does it present top-level metrics about data flowing through the various monitored services, but it also captures the data flow for each business use case identified.

Figure 4:
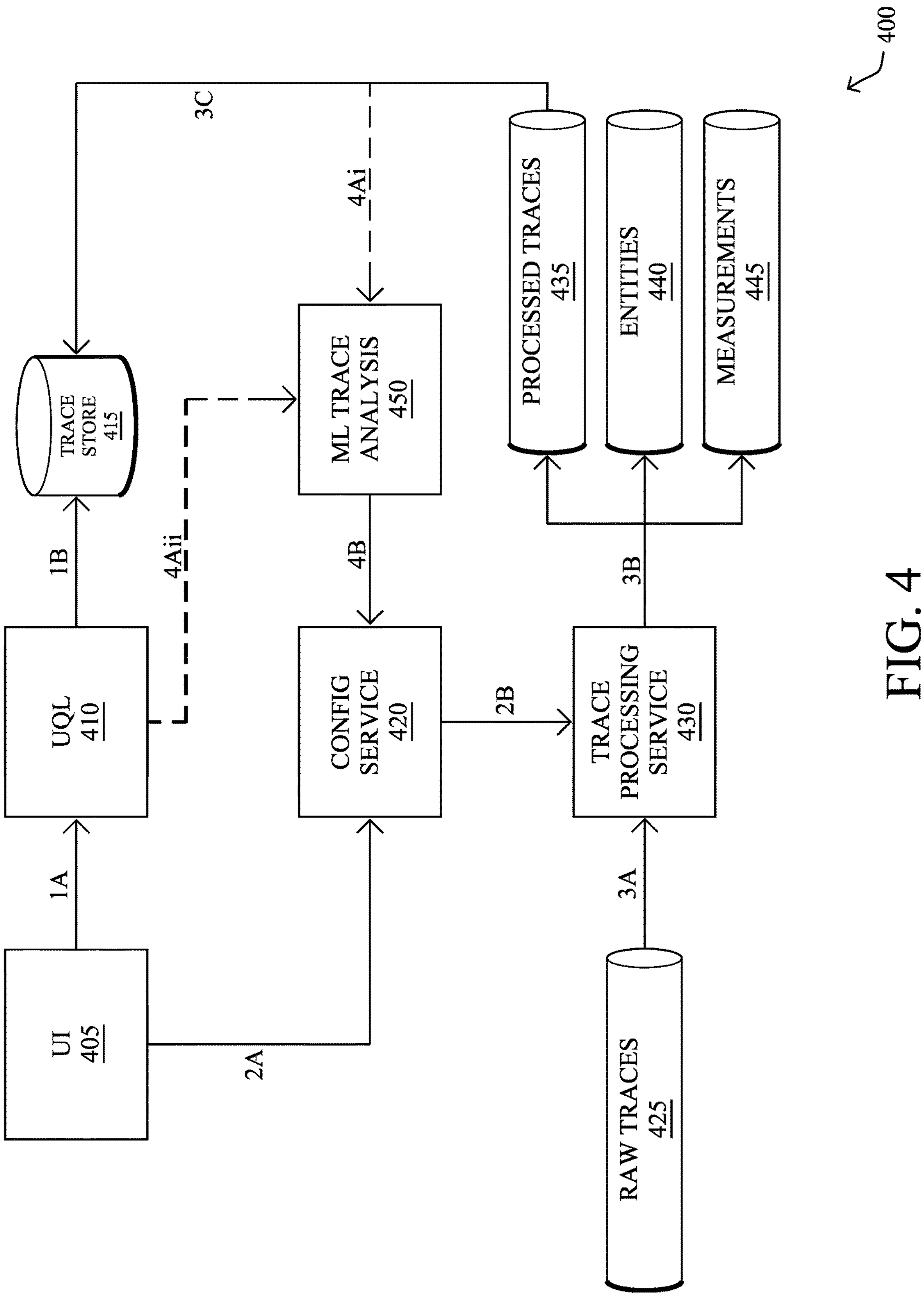
FIG. 4 illustrates an example proposed architecture for a system that provides application transaction monitoring with contextual flow information according to the techniques herein.

FIG. 4 illustrates an example proposed architecture 400 for a system that provides application transaction monitoring with contextual flow information according to the techniques herein. In particular, a user interface 405 allows for communication with a query engine 410 (e.g., a Uniform Query Language, or UQL engine) with access to a trace store 415. The user interface also communicates with a configuration service 420 to instruct a trace processing service 430, accordingly. The trace processing service takes raw traces 425 to process them into processed traces 435, entities 440, and measurements 445. In one implementation, a machine learning trace analysis engine 450 may take the results of the processed traces and certain UQL queries, and allow for refined configurations within the configuration service 420.

According to one or more implementations of the techniques herein, the system ingests batches of spans from various sources (OpenTelemetry agents and collectors) into a backend system such as that described above. Notably, spans may be grouped by trace IDs into trace messages, and the trace messages may be processed, starting at the root, and following all parent-child links.

Each span in the traversal is evaluated as a potential starting point for a business transaction. (Note that business transactions can be nested.) In particular, evaluation criteria this can be based off of may be as follows:

- Name;
- The position of the span in the trace;
- Span kind;
- Resource attributes;
- Span attributes;
- Etc.

Furthermore, the rules that define conditions on these criteria can be defined by:

- The system ("out of the box"/automatic rules);
- Machine learning algorithms evaluating the ingested data;
- A user (custom rules);
- And so on.

Once any criteria is met, a Business Transaction (BT) Entity gets created. Metrics are then reported for the BT based on the status, start, and end time of the span that discovered it. All subsequent traversal of this trace will then report data in the "context" of this BT.

According to the present disclosure, traversal of traces looks for transitions between services in the trace using span attributes and span kind. These transitions are modeled as "interactions," a special class of entity that models request flow from one entity to another. All transitions are reported in the context of any business transaction that exists at that point in the traversal. Metrics for these transitions are also reported in the context of each BT entity that exists at that point.

Additionally, references to these interactions are annotated on the spans. This allows for real-time targets queries for spans relevant to a BT, or even a transition within a BT request. Interactions can be queried based on their context, allowing for visualization of the request path taken in the context of a given BT. The BT will show the aggregate flow across all traces that resulted in its discovery.

FIG. 5 illustrates an example 500 of differences between trace views and business transaction views based on application transaction monitoring with contextual flow information according to the techniques herein. In particular, FIG. 5 illustrates trace views 510 of an example of disjointed BTs 512 and nested BTs 514 from spans A-D. According to the techniques herein, however, the BT view 520 for the disjointed BTs 522 and nested BTs 524, respectively, show a clearer contextual picture of the spans, such as based on whether the spans match certain rules or criteria for "BT1" or "BT2," accordingly.

FIG. 6 illustrates an example simplified procedure for a hybrid agent strategy for application transaction monitoring with contextual flow information in accordance with one or more implementations described herein. For example, a non-generic, specifically configured device (e.g., device 200) may perform procedure 600 by executing stored instructions (e.g., the transaction monitoring process 248). The procedure 600 may start at step 605, and continues to step 610, where, as described in greater detail above, a device, while traversing a plurality of ordered telemetry spans of a given trace message, evaluates whether any of the plurality of ordered telemetry spans are starting point spans of an application transaction. In some implementations, the plurality of ordered telemetry spans are ingested from a plurality of sources across a computer network. Further, as described above, in some implementations, the plurality of ordered telemetry spans can comprise one or more of OpenTelemetry data, metrics, events, logs, and/or traces.

The procedure 600 continues to step 615 where, as described in greater detail above, the device reports metrics corresponding to a particular application transaction based on a corresponding starting point span.

The procedure 600 continues to step 620 where, as described in greater detail above, the device reports additional metrics from subsequent spans of the plurality of ordered telemetry spans following the corresponding starting point span within a context of the particular application transaction. As discussed herein, the metrics corresponding to the particular application transaction and/or the further additional metrics can be reported in real-time, although implementations are not so limited. The procedure 600 may further include reporting, as part of reporting the additional metrics from the subsequent spans, information corresponding to one or more identified application use (e.g., business use) cases associated with the application transaction.

In some implementations, one or more of the subsequent spans (e.g., a particular one of the of the plurality of ordered telemetry spans is/are secondary starting point(s) spans of the application transaction. In such implementations, the procedure 600 may further include reporting, by the device, metrics corresponding to the secondary application transaction within the context of the particular application transaction and reporting, by the device, further additional metrics from further subsequent spans of the plurality of ordered telemetry spans following the secondary starting point span within the context of the particular application transaction and a secondary context of the secondary application transaction.

As described above, the given trace message may include one or more transitions (e.g., "splits") to establish a plurality of trace paths for the given trace message. In such implementations, the subsequent spans of the plurality of ordered telemetry spans are divided into corresponding paths of the plurality of trace paths (e.g., can comprise a subset of the plurality of ordered telemetry spans having a particular path subsequent to the one or more transitions). In such implementations, the additional metrics from subsequent spans of the plurality of ordered telemetry spans can be reported based on the corresponding paths of the subsequent spans. The procedure 600 can, in such implementations, include receiving, by the device, a query for information corresponding to the one or more transitions and providing a visualization of a particular corresponding path within a specific context of a corresponding application transaction associated with the particular corresponding path, e.g., via a user interface.

In some implementations, the procedure 600 may include evaluating whether any of the plurality of ordered telemetry spans are starting point spans of an application transaction by evaluating an evaluation criterion chosen from a group consisting of: a name of the application transaction; a position of a respective telemetry span among the plurality of ordered telemetry spans of the given trace message; a span type associated with the respective telemetry span among the plurality of ordered telemetry spans; resource attributes associated with the application transaction; and attributes associated with the plurality of ordered telemetry spans. The evaluating step may be performed based on applying a machine learning model to the plurality of ordered telemetry spans, among other possibilities.

In such implementations, the application transaction can be associated with groups of requests that share at least one of a common trace structure or a common attribute pattern. As an example, a business transaction entity corresponding to the application transaction can be generated in response to the evaluation criterion being met. As discussed above, the business transaction entity can be associated with groups of requests that share at least one of a common trace structure or a common attribute pattern, or both.

The procedure 600 may then end in step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

In some implementations, an apparatus comprising one or more network interfaces to communicate with a network, a processor coupled to the one or more network interfaces and configured to execute one or more processes, and a memory configured to store a process that is executable by the processor. In such implementations, the process, when executed, may be configured to evaluate, by a device while traversing a plurality of ordered telemetry spans of a given trace message, whether any of the plurality of ordered telemetry spans are starting point spans of an application transaction; report, by the device, metrics corresponding to a particular application transaction based on a corresponding starting point span; and report, by the device, additional metrics from subsequent spans of the plurality of ordered telemetry spans following the corresponding starting point span within a context of the particular application transaction.

In still other implementations, a tangible, non-transitory, computer-readable medium can have computer-executable instructions stored thereon that, when executed by a processor on a computer, cause the computer to perform a method comprising evaluating, by a device while traversing a plurality of ordered telemetry spans of a given trace message, whether any of the plurality of ordered telemetry spans are starting point spans of an application transaction; reporting, by the device, metrics corresponding to a particular application transaction based on a corresponding starting point span; and reporting, by the device, additional metrics from subsequent spans of the plurality of ordered telemetry spans following the corresponding starting point span within a context of the particular application transaction.

The techniques described herein, therefore, provide for application transaction monitoring with contextual flow information. More particularly, the techniques described herein allow for application transaction monitoring with contextual flow information that allow for contextual information to enhance business transactions, giving thereby greater visibility into the functions underlying a business transaction and aiding in troubleshooting, as described herein. In other words, the techniques herein intelligently derive application transactions (business transactions) from OpenTelemetry trace data, i.e., capturing the concept of an application transaction as an aggregation of traces/spans.

Illustratively, the techniques described herein may be performed by hardware, software, and/or firmware, (e.g., an "apparatus") such as in accordance with the transaction monitoring process 248, e.g., a "method"), which may include computer-executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process (e.g., the transaction monitoring process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the implementations have been shown and described herein with relation to specific network configurations (orientations, topologies, protocols, terminology, processing locations, etc.). However, the implementations in their broader sense are not as limited, and may, in fact, be used with other types of networks, protocols, and configurations.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions stored thereon executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

evaluating, by a device while traversing a plurality of ordered telemetry spans of a given trace message, whether any of the plurality of ordered telemetry spans are starting point spans of an application transaction by following parent-child links between the telemetry spans, wherein the evaluating comprises evaluating each telemetry span encountered during the traversing as a potential starting point span;

reporting, by the device, metrics corresponding to a particular application transaction based on a corresponding starting point span; and reporting, by the device, additional metrics from subsequent spans of the plurality of ordered telemetry spans following the corresponding starting point span within a context of the particular application transaction, wherein a particular subsequent span of the subsequent spans is a secondary starting point span of a secondary application transaction, and wherein at least one of the additional metrics corresponding to a span following the secondary starting point span is reported within the context of the particular application transaction and a secondary context of the secondary application transaction.

2. The method as in claim 1, further comprising:

reporting, by the device, metrics corresponding to the secondary application transaction within the context of the particular application transaction.

3. The method as in claim 1, wherein:

the given trace message includes one or more transitions to establish a plurality of trace paths for the given trace message, the subsequent spans of the plurality of ordered telemetry spans are divided into corresponding paths of the plurality of trace paths, and reporting the additional metrics from subsequent spans of the plurality of ordered telemetry spans are further based on the corresponding paths of the subsequent spans.

4. The method as in claim 3, further comprising:

receiving, by the device, a query for information corresponding to the one or more transitions; and providing a visualization of a particular corresponding path within a specific context of a corresponding application transaction associated with the particular corresponding path.

5. The method as in claim 1, wherein evaluating comprises, for each telemetry span encountered during the traversing, determining whether the telemetry span satisfies one or more evaluation criterion chosen from: a name of the telemetry span; a position of the telemetry span among the plurality of ordered telemetry spans of the given trace message; a span kind of the telemetry span; one or more resource attributes associated with the telemetry span; or one or more span attributes associated with the telemetry span.

6. The method as in claim 1, further comprising:
associating the application transaction with groups of requests that share at least one of a common trace structure or a common attribute pattern, or both.

7. The method as in claim 1, further comprising:
reporting information corresponding to one or more identified application use cases associated with the application transaction.

8. The method as in claim 1, further comprising:
ingesting the plurality of ordered telemetry spans of the application transaction from a plurality of sources across a computer network.

9. The method as in claim 1, wherein the plurality of ordered telemetry spans comprise one or more of OpenTelemetry data, metrics, events, logs, or traces.

10. The method as in claim 1, wherein evaluating is based on applying a machine learning model to the plurality of ordered telemetry spans.

11. An apparatus, comprising:
one or more network interfaces to communicate with a network;
a processor coupled to the one or more network interfaces and configured to execute one or more processes; and
a memory configured to store a process that is executable by the processor, the process, when executed, configured to:
evaluate, while traversing a plurality of ordered telemetry spans of a given trace message, whether any of the plurality of ordered telemetry spans are starting point spans of an application transaction by following parent-child links between the telemetry spans, wherein the evaluating comprises evaluating each telemetry span encountered during the traversing as a potential starting point span;
report metrics corresponding to a particular application transaction based on a corresponding starting point span; and
report additional metrics from subsequent spans of the plurality of ordered telemetry spans following the corresponding starting point span within a context of the particular application transaction, wherein a particular subsequent span of the subsequent spans is a secondary starting point span of a secondary application transaction, and wherein at least one of the additional metrics corresponding to a span following the secondary starting point span is reported within the context of the particular application transaction and a secondary context of the secondary application transaction.

12. The apparatus as in claim 11, wherein the process, when executed, is configured to:
report metrics corresponding to the secondary application transaction within the context of the particular application transaction.

13. The apparatus as in claim 11, wherein:
the given trace message includes one or more transitions to establish a plurality of trace paths for the given trace message,
the subsequent spans of the plurality of ordered telemetry spans are divided into corresponding paths of the plurality of trace paths, and
the additional metrics from subsequent spans of the plurality of ordered telemetry spans are reported further based on the corresponding paths of the subsequent spans.

14. The apparatus as in claim 13, wherein the process, when executed, is configured to:
receive a query for information corresponding to the one or more transitions; and
provide a visualization of a particular corresponding path within a specific context of a corresponding application transaction associated with the particular corresponding path.

15. The apparatus as in claim 11, wherein the process, when executed, is configured to:
evaluate whether any of the plurality of ordered telemetry spans are starting point spans of an application transaction by evaluating one or more evaluation criterion chosen from a group consisting of: a name of the application transaction; a position of a respective telemetry span among the plurality of ordered telemetry spans of the given trace message; a span type associated with the respective telemetry span among the plurality of ordered telemetry spans; resource attributes associated with the application transaction; and attributes associated with the plurality of ordered telemetry spans.

16. The apparatus as in claim 11, wherein the process, when executed, is configured to:
associate the application transaction with groups of requests that share at least one of a common trace structure or a common attribute pattern, or both.

17. The apparatus as in claim 11, wherein the process, when executed, is configured to:
report information corresponding to one or more identified application use cases associated with the application transaction.

18. The apparatus as in claim 11, wherein the process, when executed, is configured to:
ingest the plurality of ordered telemetry spans of the application transaction from a plurality of sources across a computer network.

19. The apparatus as in claim 11, wherein the process, when executed, to evaluate, is configured to:
apply a machine learning model to the plurality of ordered telemetry spans.

20. A tangible, non-transitory, computer-readable medium having computer-executable instructions stored thereon that, when executed by a processor on a computer, cause the computer to perform a method comprising:
evaluating, while traversing a plurality of ordered telemetry spans of a given trace message, whether any of the plurality of ordered telemetry spans are starting point spans of an application transaction by following parent-child links between the telemetry spans, wherein the evaluating comprises evaluating each telemetry span encountered during the traversing as a potential starting point span;
reporting metrics corresponding to a particular application transaction based on a corresponding starting point span; and
reporting additional metrics from subsequent spans of the plurality of ordered telemetry spans following the corresponding starting point span within a context of the particular application transaction, wherein a particular subsequent span of the subsequent spans is a secondary starting point span of a secondary application transaction, and wherein at least one of the additional metrics corresponding to a span following the secondary starting point span is reported within the context of the particular application transaction and a secondary context of the secondary application transaction.

* * * * *